United States Patent
Guichon

(10) Patent No.: US 9,744,811 B2
(45) Date of Patent: Aug. 29, 2017

(54) TIRE TREAD HAVING GROOVE WITH INTERNAL VOIDS

(75) Inventor: Cyril Guichon, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 715 days.

(21) Appl. No.: 14/129,821

(22) PCT Filed: Jun. 30, 2011

(86) PCT No.: PCT/US2011/042568
§ 371 (c)(1),
(2), (4) Date: Dec. 27, 2013

(87) PCT Pub. No.: WO2013/002801
PCT Pub. Date: Jan. 3, 2013

(65) Prior Publication Data
US 2014/0130950 A1 May 15, 2014

(51) Int. Cl.
*B60C 11/13* (2006.01)
*B60C 11/04* (2006.01)
*B60C 11/03* (2006.01)
*B60C 11/12* (2006.01)

(52) U.S. Cl.
CPC .......... *B60C 11/13* (2013.01); *B60C 11/0306* (2013.04); *B60C 11/0323* (2013.04); *B60C 11/04* (2013.01); *B60C 11/1281* (2013.04); *B60C 2011/0365* (2013.04); *B60C 2011/0369* (2013.04)

(58) Field of Classification Search
CPC . B60C 11/04; B60C 11/0306; B60C 11/1281; B60C 11/0323; B60C 11/13; B60C 2011/0365; B60C 2011/0369
USPC .................................. 152/209.18, 209.25
See application file for complete search history.

(56) References Cited

U.S. PATENT DOCUMENTS

| | | | |
|---|---|---|---|
| 4,994,126 A | 2/1991 | Lagnier | |
| 5,385,189 A * | 1/1995 | Aoki | B60C 11/04 |
| | | | 152/209.21 |
| 5,772,806 A | 6/1998 | Moriya | |
| 7,793,692 B2 | 9/2010 | Nguyen et al. | |
| 9,387,728 B2 * | 7/2016 | Warfford | B60C 11/00 |
| 2010/0243119 A1 | 9/2010 | Miyazaki | |

(Continued)

FOREIGN PATENT DOCUMENTS

| EP | 0 378 090 A1 | 7/1990 |
|---|---|---|
| EP | 0705721 A2 | 4/1996 |
| EP | 2492117 A1 | 8/2012 |

(Continued)

OTHER PUBLICATIONS

PCT International Search Report for PCT/US2011/042568, dated Nov. 30, 2011.
European Search Report dated May 22, 2015, 7 pages.

*Primary Examiner* — Seyed Masoud Malekzadeh
(74) *Attorney, Agent, or Firm* — Dority & Manning, P.A.

(57) ABSTRACT

A tire having a tread with a novel groove structure for enhanced wet and snow traction is provided. The groove includes an upper portion and a lower portion that can provide enhanced wet and snow traction over various stages of tread wear without unnecessary compromise to the tread rigidity. The lower portion includes one more voids for the accumulation and/or evacuation of fluids.

14 Claims, 9 Drawing Sheets

(56) References Cited

U.S. PATENT DOCUMENTS

2012/0227883 A1    9/2012    Audigier et al.

FOREIGN PATENT DOCUMENTS

| JP | H02267009 A    | 10/1990 |
| JP | 1993-169917 A  | 7/1993  |
| JP | 05-310011      | 11/1993 |
| JP | 2006-051863 A  | 2/2006  |
| JP | 2009280035     | 12/2009 |
| WO | WO 2011039194 A1 | 4/2011 |
| WO | WO2011049062 A1  | 4/2011 |

* cited by examiner

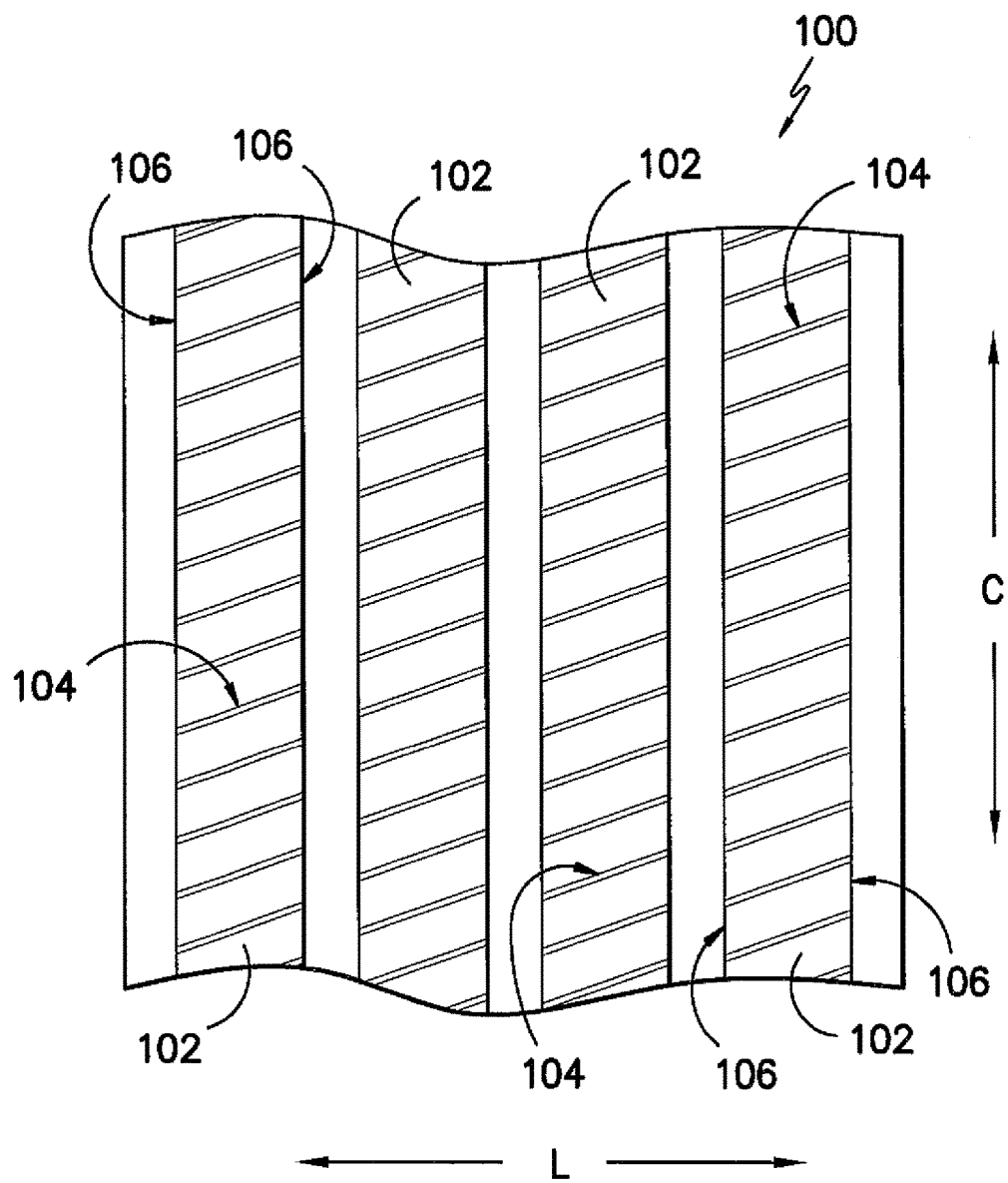
FIG. -1-

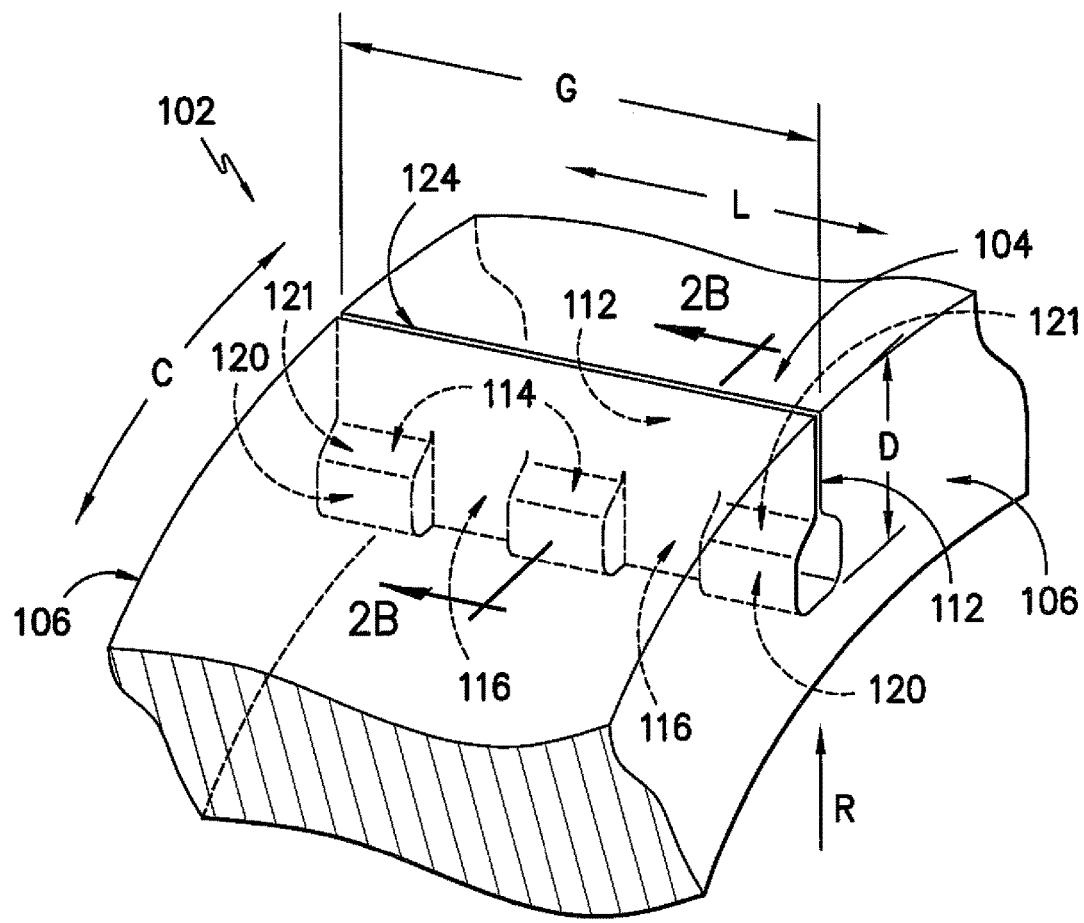
FIG. -2A-
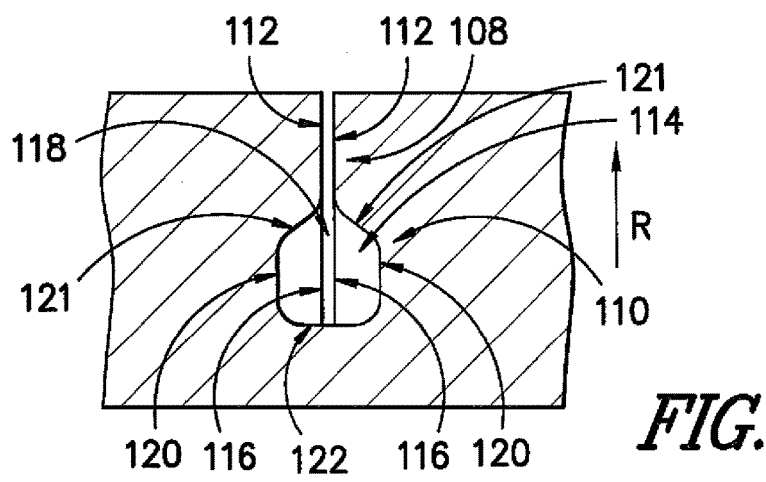
FIG. -2B-

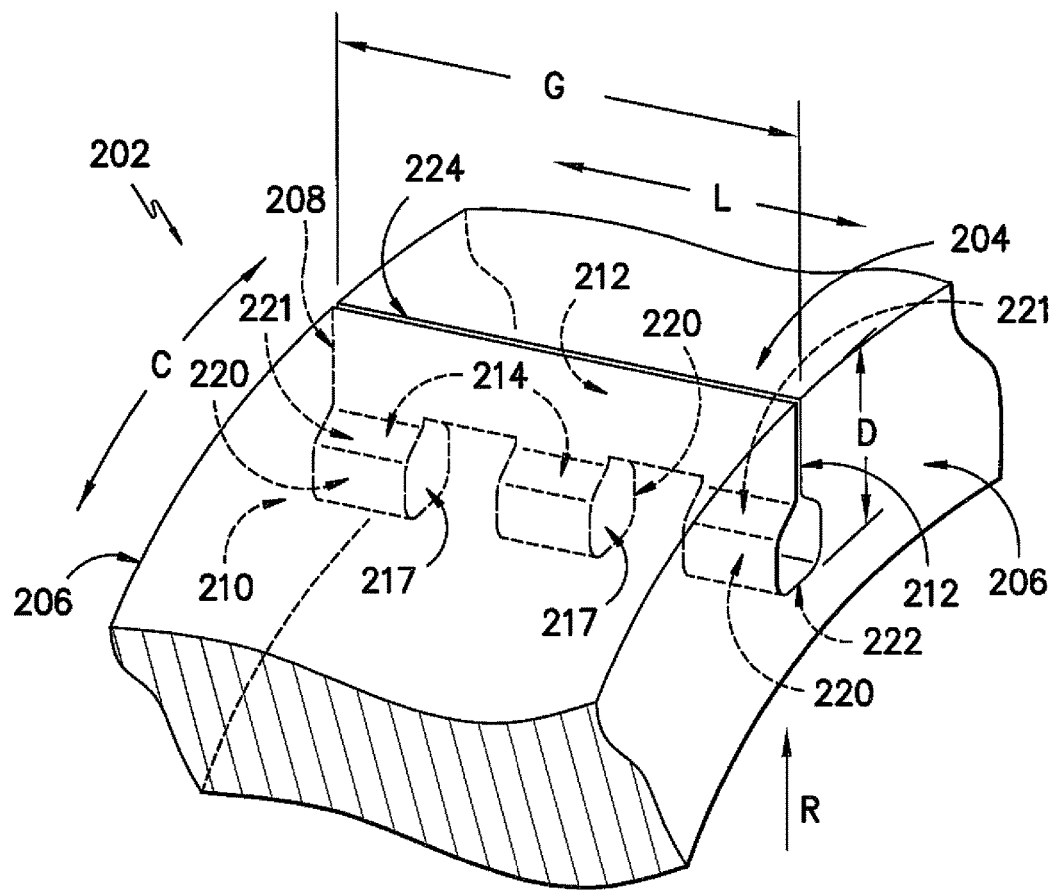
FIG. —3—

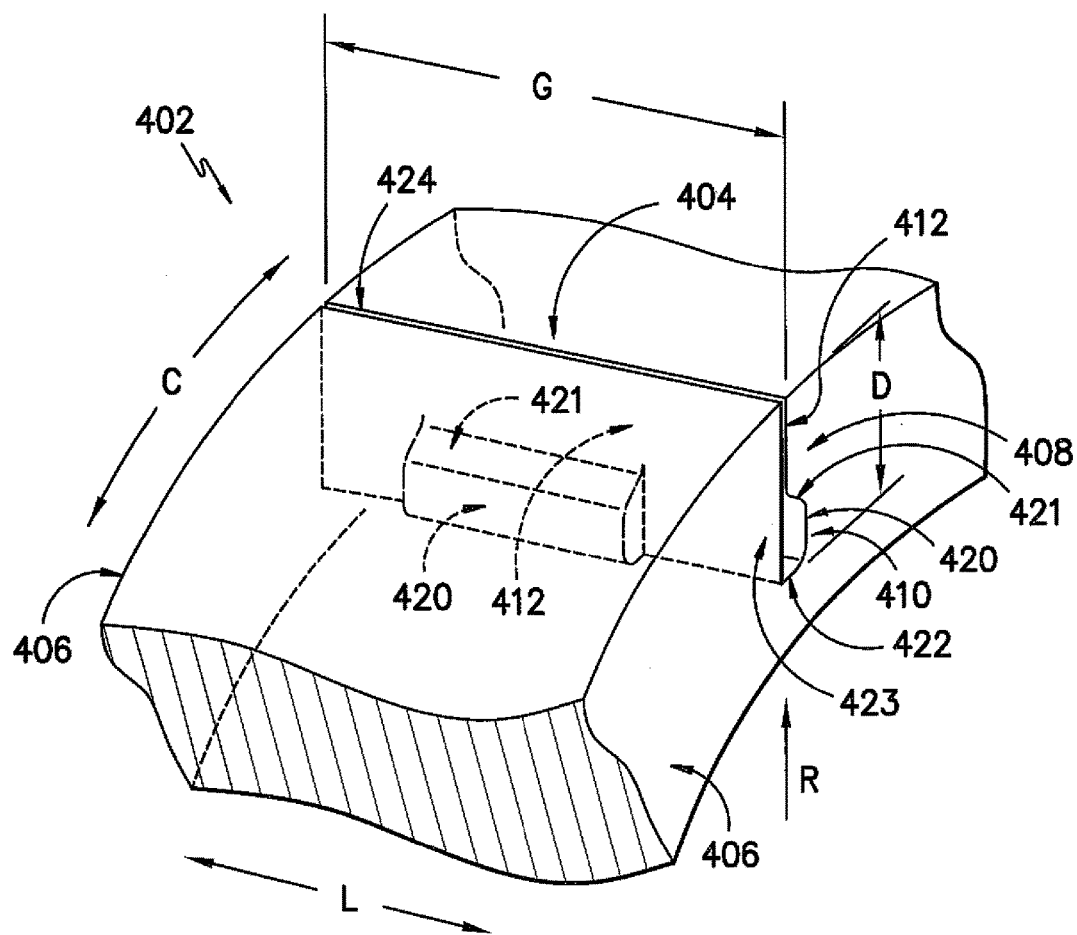
FIG. -4A-

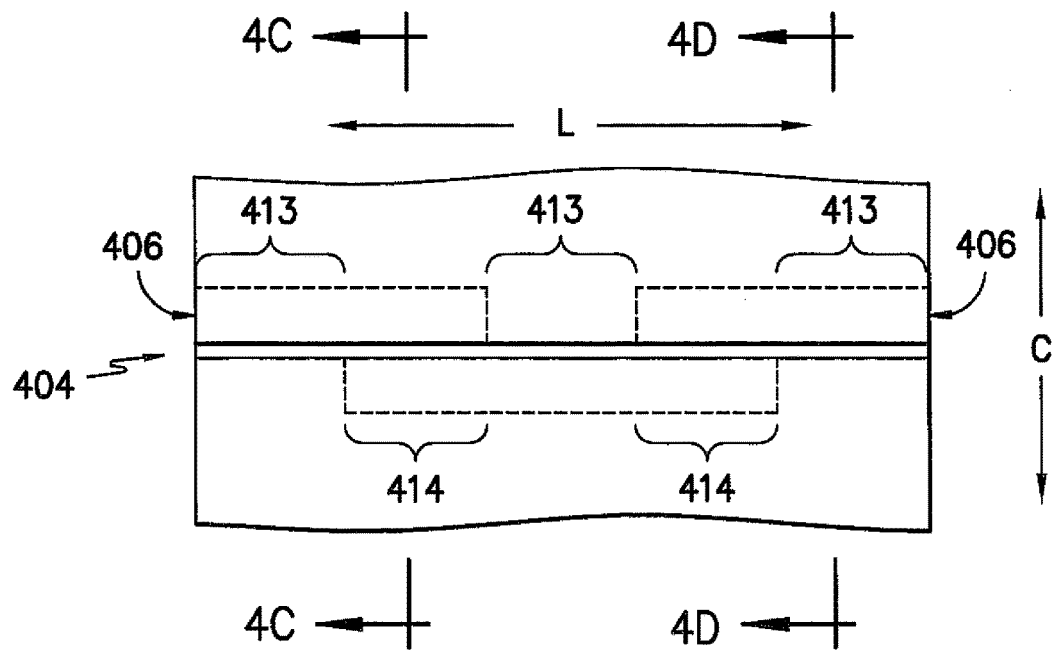
FIG. -4B-
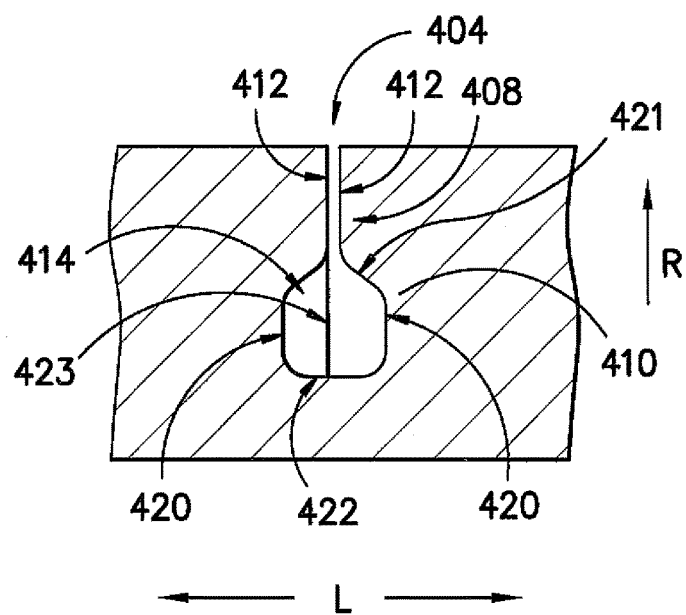
FIG. -4C-

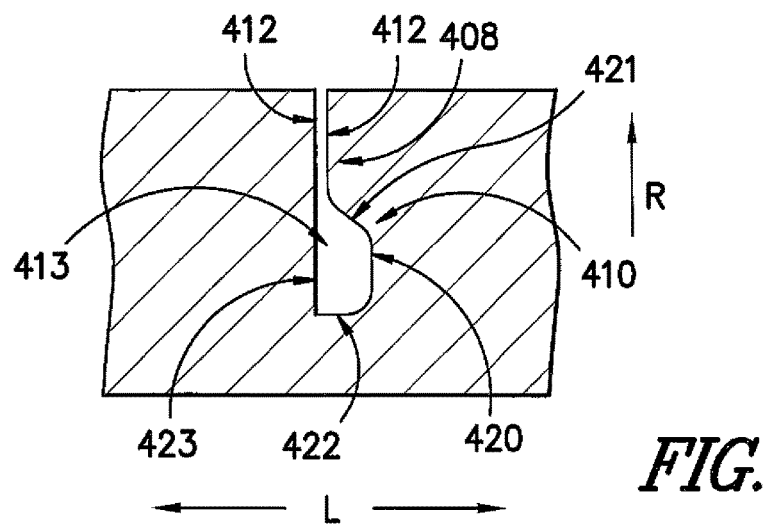
FIG. -4D-
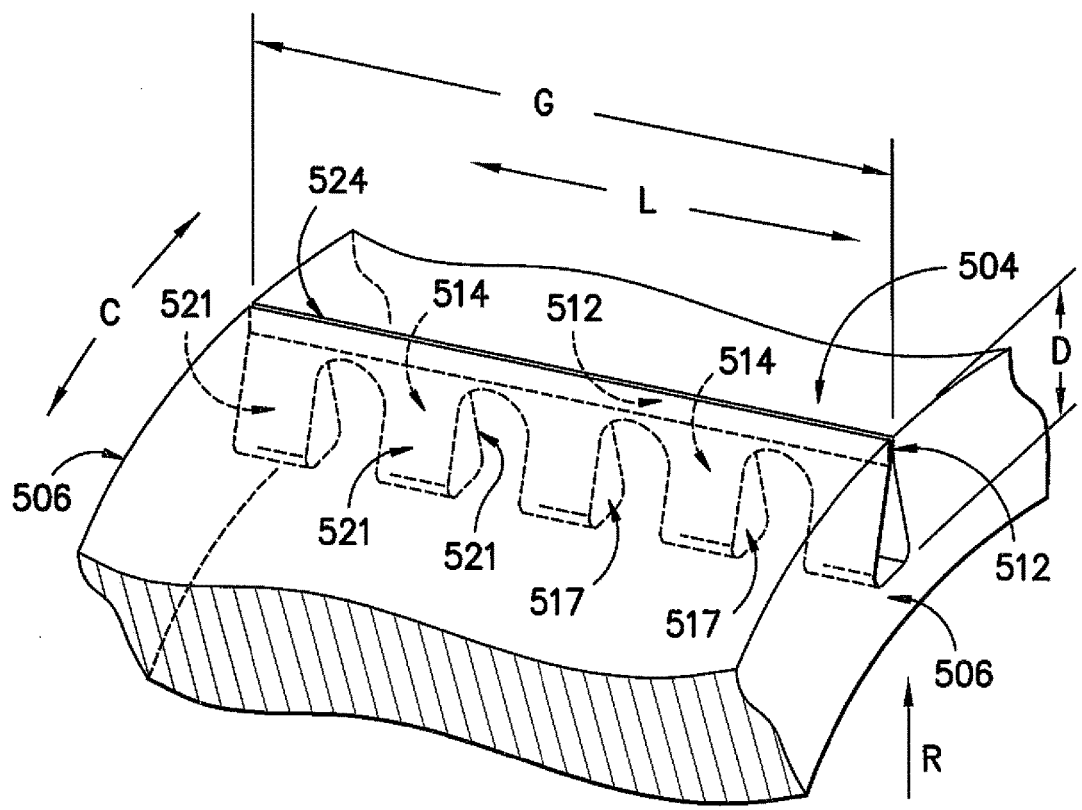
FIG. -5A-

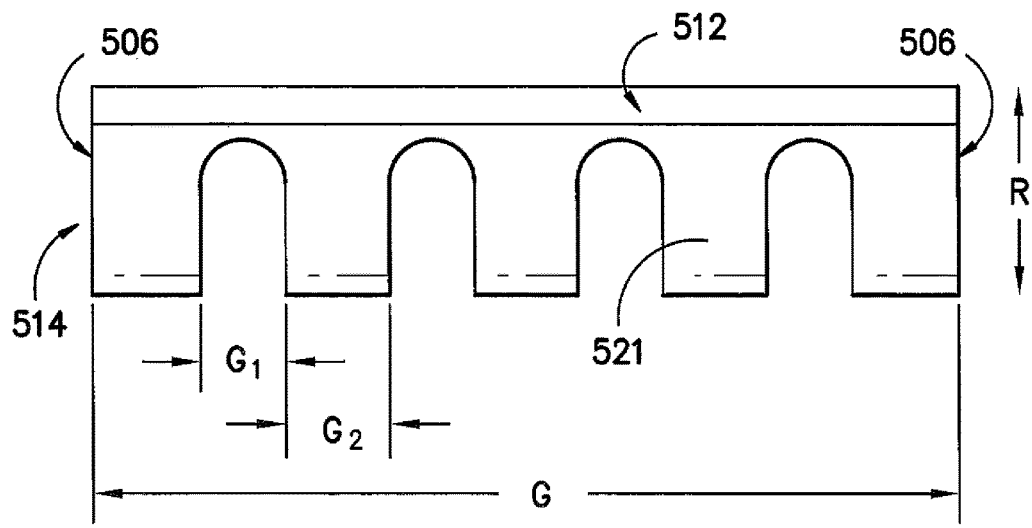
FIG. -5B-
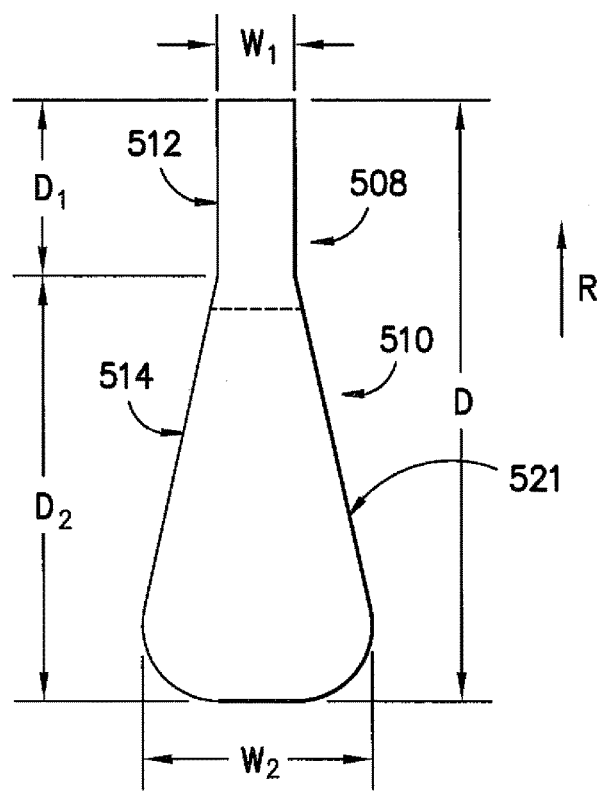
FIG. -5C-

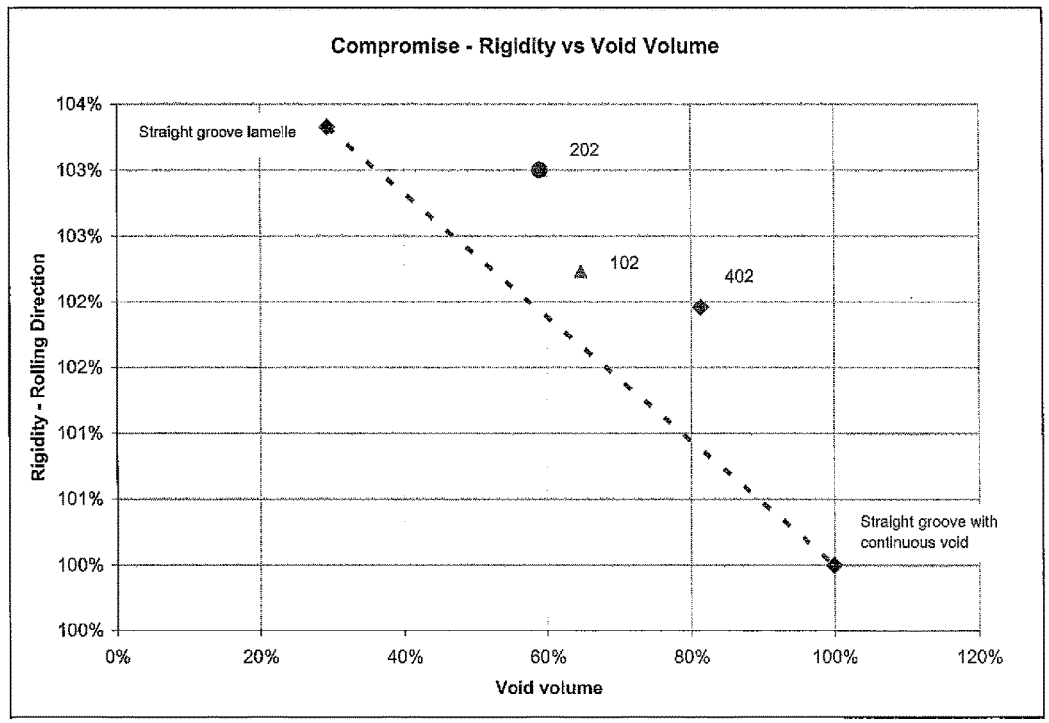
*FIG. -6-*

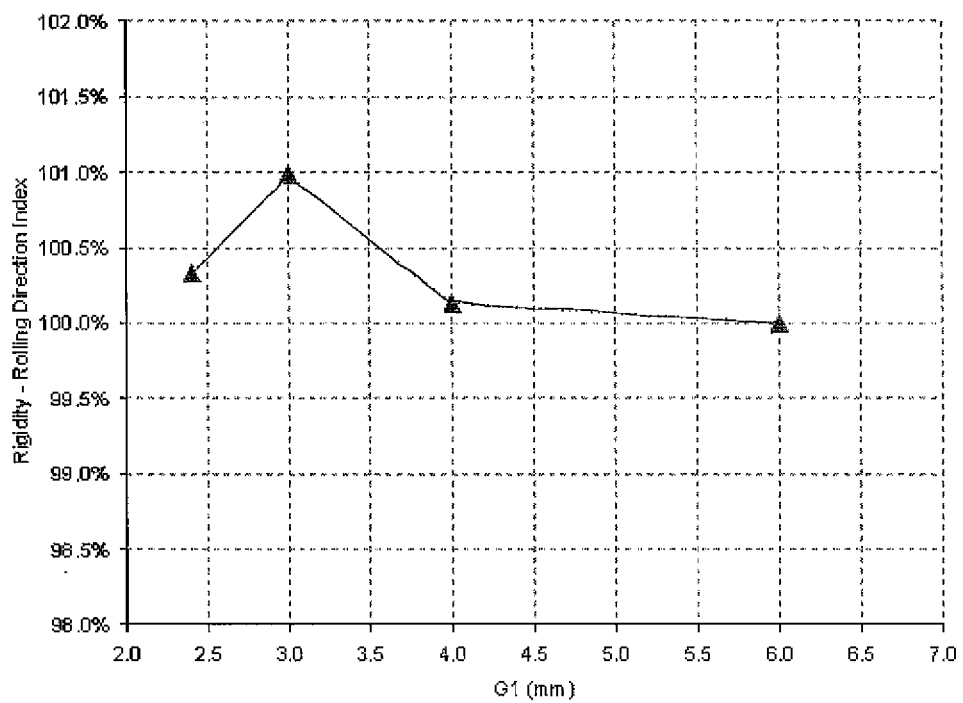
*FIG. -7-*

TIRE TREAD HAVING GROOVE WITH INTERNAL VOIDS

FIELD OF THE INVENTION

The present invention relates to tire having a tread with a novel groove structure for enhanced wet and snow traction over various stages of tread wear without unnecessary compromise to the tread rigidity.

BACKGROUND OF THE INVENTION

During typical use on passenger or commercial vehicles, tires can encounter wet and/or snow conditions depending upon the geographic location of use. Accordingly, tires have frequently been provided with various features in an effort enhance traction under such conditions. For example, grooves may be provided that create edges to improve snow traction and to provide for accumulation and evacuation of fluids to improve wet traction.

Unfortunately, the addition of various features to improve wet and snow traction may adversely affect other aspects of tire performance. For example, the addition of grooves can reduce the rigidity of the tread. Such reduced rigidity can have an undesired impact on e.g., wear, rolling resistance, and other characteristics.

Accordingly, a tire having a tread for improved wet and snow traction would be useful. A tire that can provide such improved traction over the life of its tread would also be very useful. A tire that can also provide such traction without unnecessary compromise to the rigidity of the tread, particularly at the early stages of tread life, would also be beneficial.

SUMMARY OF THE INVENTION

Aspects and advantages of the invention will be set forth in part in the following description, or may be obvious from the description, or may be learned through practice of the invention.

In one exemplary embodiment, the present invention provides a tire having an axis of rotation and defining lateral and circumferential directions. The tire includes a tread portion extending circumferentially around the tire. The tread portion has at least one tread feature that includes a pair of sides that are opposed along the lateral direction and a groove extending between the pair of sides. The groove includes a radially-outer portion that is fluidly connected with a radially-inner portion. The radially-outer portion of the groove is defined by a pair of planar walls extending substantially parallel to each other. The radially-inner portion of the groove includes a plurality of voids that are spaced apart along the length of the groove. Each void is defined by i) a pair of diverging side walls that diverge along the radial direction moving toward the axis of rotation of the tire and ii) a basewall connected between the pair of diverging side walls.

In another exemplary embodiment, the present invention provides a tire having an axis of rotation and defining lateral and circumferential directions. The tire includes a tread portion extending circumferentially around the tire. The tread portion has at least one tread feature that includes a groove extending between laterally opposing sides of the tread feature. The groove defines a length and has a top portion defined by substantially parallel, opposing top walls extending along the direction of the groove length, and a bottom portion defined by opposing bottom walls. At least one of the opposing side walls diverges from the radial direction to define at least one cavity between the opposing side walls. The bottom portion and the top portion are in fluid communication with each other. Along the length of the groove the bottom portion alternates between i) a cavity created by only one of the opposing side walls diverging from the radial direction and ii) a cavity created by both of the opposing side walls diverging from the radial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a partial perspective view of an exemplary tread portion for a tire as may be used with the present invention. The aesthetics of the particular design shown are provided by way of example only.

FIG. 2A is a partial perspective view of an exemplary tread feature, a rib in this example, as may be used with the present invention. An exemplary embodiment of a groove of the present invention is shown with dashed lines representing internal features. FIG. 2B provides a cross-sectional view of this embodiment, taken along lines 2B-2B of FIG. 2A.

FIG. 3 is a partial perspective view of another exemplary tread feature, a rib in this example, as may be used with the present invention. Another exemplary embodiment of a groove of the present invention is shown with dashed lines representing internal features.

FIG. 4A is a partial perspective view of another exemplary tread feature, a rib in this example, as may be used with the present invention. Another exemplary embodiment of a groove of the present invention is shown with dashed lines representing internal features. FIG. 4B is a partial top view of the exemplary embodiment of FIG. 4A with dashed lines representing internal features. FIG. 4C is a cross-sectional view taken along line 4C-4C in FIG. 4B. FIG. 4D is another cross-sectional view taken along line 4D-4D in FIG. 4B.

FIG. 5A is a partial perspective view of another exemplary tread feature, a rib in this example, as may be used with the present invention. Another exemplary embodiment of a groove of the present invention is shown with dashed lines representing internal features.

FIG. 5B is side view of the mold negative of the exemplary groove of FIG. 5A. Stated alternatively, if the groove of FIG. 5A was converted to a solid shape, the resulting shape would appear as in FIG. 5B. FIG. 5C is a side view of one of the cavities of the exemplary groove of the present invention with dimensions as described herein.

FIGS. 6 and 7 are plots of simulated data as will be described below.

The use of identical or similar reference numerals in different figures denotes identical or similar features.

DETAILED DESCRIPTION OF THE INVENTION

The present invention relates to tire having a tread with a novel groove structure for enhanced wet and snow traction over various stages of tread wear without unnecessary compromise to the tread rigidity. Voids are provided in a lower portion of a groove and include edges for traction while also contributing to evacuation and accumulation, particularly at later stages of the tread life. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

FIG. 1 is a partial perspective view of an exemplary tread portion 100 for a tire as may be used with the present invention. Tread portion 100 includes multiple tread features or ribs 102 that extend around the circumferential direction C of the tire. As will be understood by one of skill in the art using the teachings disclosed herein, the present invention may be used with other types of tread features as well such as e.g., tread blocks and others.

Tread portion 100 is mounted onto a tire (not shown) that defines lateral direction L, circumferential direction C, and radial direction R (which is shown in FIGS. 2-7). As will be readily understood, circumferential direction C extends around the circumference of the tire, lateral direction L is perpendicular to circumferential direction C and extends between the shoulders of the tire, and radial direction R represents a radius from the axis of rotation of the tire. The axis of rotation of the tire is also parallel to lateral direction L.

Ribs 102 include a plurality of grooves 104 extending between a pair of sides 106 that oppose each other along lateral direction L. The aesthetics of the particular tread portion 100 shown are provided by way of example only and other embodiments are within the scope of the invention. For example, grooves 104 are shown in FIG. 1 as extending between sides 106 at a particular angle from lateral direction L but other angles may also be used. For example, in FIGS. 2 through 5, such grooves are shown parallel to the lateral direction L. While a plurality of grooves 104 are all shown at the same angle with respect to lateral direction L in FIG. 1, a combination of different angles may also be used in that grooves 104 of different ribs 102 may be at different angles with respect to one another or grooves 104 on a given rib may be provided at various angles. Other configurations may also be used.

FIG. 2A is a partial perspective view of a single rib 102 where for clarity groove 104 is illustrated as parallel to lateral direction L and where dashed lines represent internal features. FIG. 2B provides a cross-sectional view of a cavity or void 114 taken along lines 2B-2B as shown in FIG. 2A. Groove 104 includes a top or radially outer portion 108 (FIG. 2B) that is fluidly connected with a bottom or radially inner portion 110. As used herein, "fluidly connected" or "in fluid communication" means the two portions 108 and 110 are connected such that a fluid (e.g., water) could pass between the two portions.

Radially-outer portion 108 of groove 104 is defined by a pair of walls 112 that are substantially parallel with one another and substantially parallel to radial direction R. For this exemplary embodiment, the pair of wall 112 are each substantially planar. Top walls 112 oppose one another along radial direction R and also extend along the entire length G of groove 104. The radially-inner portion 110 of groove 104 includes a plurality of cavities or voids 114. As best shown in FIG. 2, voids 114 are spaced apart along the length G of groove 104. For this particular exemplary embodiment, voids 114 are fluidly connected with each other along the length G of groove 104 by a pair of connecting walls 116 that extend substantially parallel to one another and radial direction R so as to create a channel 118 through which a fluid can flow between voids 114.

Still referring to FIGS. 2A and 2B, the radially-inner portion 110 of each void 114 is defined by a pair of opposing side walls 121 that diverge along the radial direction R moving toward the axis of rotation of the tire (i.e. moving in a direction opposite to radial direction R). A pair of substantially parallel walls 120 also extend along the radial direction and connect to walls 121. To complete void 114, a base wall 122 connects to walls 120 and spans between walls 120. Base wall 122 is positioned radially inward or below the pair of diverging side walls 121 as best shown in FIG. 2B. Although three voids are shown for groove 104 in FIG. 2, a single void 114 or multiple voids 114 may be employed as well.

Accordingly, during operation of a tire containing tread feature 102, groove 104 provides edges 124 and voids 114 that can enhance wet and snow traction by providing grip as well as allowing for the storage and evacuation of snow and fluids such as water along its length G. During the early life of the tire while the radially outer portion 108 is present, groove 104 has an initial depth D. As the tire wears, the overall depth D decreases. In a tire without groove 104, this reduction in depth would typically reduce the volume available for water and snow accumulation and negatively affect wet and snow traction. While more grooves (i.e. grooves without voids 114) might be added to such a tire in an effort to improve traction, this addition will also decrease the rigidity of the tread, which can negatively impact other aspects of tire performance such as wear. In contrast, with the grooves of the present invention (such as the exemplary embodiments shown in grooves 104), a reduction in overall depth D eventually wears the tread down to the voids 114 of radially inner portion 110, which continue to provide edges, accumulation, and evacuation to enhance wet and snow traction without unacceptably decreasing the rigidity of tread feature 102.

FIG. 3 illustrates another tread feature 202 with a groove 204 similar to the embodiment of a groove 104 shown in FIGS. 2A and 2B. However, in this exemplary embodiment of the present invention, groove 204 lacks a pair of connecting walls (compare with walls 116 in FIGS. 2A-2B) between voids 214. Instead, a span wall 217 connecting between walls 220 and diverging walls 221 is provided on this portion of void 214. Accordingly, voids 214 are fluidly connected along length G only by the radially outer potion 208 of groove 204. For certain applications, this exemplary embodiment can provide sufficient wet and snow traction without such connecting walls.

Another exemplary embodiment of the invention is illustrated in FIGS. 4A and 4B. More specifically, FIG. 4A is a partial perspective view of a tread feature, a rib 402 in this example, as may be used with the present invention. A groove 404 of the present invention is shown with dashed lines representing internal features. FIG. 4B is a partial top view of the exemplary embodiment of FIG. 4A, again with dashed lines representing internal features.

Groove 404 includes a top or radially outer portion 408 that is fluidly connected with a bottom or radially inner portion 410. As with previous embodiments, radially outer portion 408 of groove 404 is defined by a pair of walls 412 that are substantially parallel with one another and substantially parallel to radial direction R. Top walls 412 oppose one another along radial direction R and also extend along the entire length G of groove 404.

As shown most clearly in FIG. 4B, the radially-inner portion 410 of groove 404 includes a plurality of voids 414 and partial voids 413. Voids 414 and partial voids 413 alternate along the length G of groove 404 and are fluidly connected with each other. Referring to FIG. 4C, each void 414 is defined by a pair of opposing side walls 421 that diverge along the radial direction R moving toward the axis of rotation of the tire (i.e. moving in a direction opposite to radial direction R). To complete void 414, a base wall 422 connects to walls 420, extends between walls 420, and is located below or radially inward of the pair of diverging side walls 421. As shown in FIG. 4D, partial voids 413 are defined on one side by a single diverging side wall 421 that diverges from radial direction R moving toward the axis of rotation of the tire (i.e. moving opposite to radial direction R) and connects with wall 420. On the other side, partial voids 413 are defined by a side wall 423 that is substantially parallel to the radial direction R. A base wall 422 connects to wall 420 and sidewall 423 and extends between them. Base wall 422 is positioned below, or radially inward of, diverging side wall 421.

FIG. 5A illustrates another exemplary embodiment of a tread feature 502 with a groove 504. The exemplary embodiment of FIG. 5A is similar to the embodiment of FIG. 3 except for the shape of the diverging and opposing side walls 521. As a comparison of FIGS. 3 and 5A reveals, the shape of walls 321 and 521 are different and are provided by way of example only. Using the teachings disclosed herein, one or ordinary skill in the art will understand that a variety of different shapes may be used for the opposing side walls 521. Additionally, the number of voids 514 is different from what is used in other embodiments of the invention, it being understood that a different number of voids may be employed in various embodiments.

Dimensions for preferred embodiments of a void are shown in FIGS. 5B and 5C using void 521 of groove 504 by way of example. More particularly, groove 504 is shown having a top or radially-outer portion 508 with a depth D1 along the radial direction and a bottom or radially-inner portion 510 with a depth D2 along the radial direction. The sum of D1 and D2 provides the overall depth D of groove 504. Additionally, W1 represents the width of the top portion 508 while W2 represents the width of the bottom portion 510. G2 represents the width of a void 521 along the direction of length L of groove 504. G1 represents the width or amount of separation between voids 521 along the direction of length L.

In a preferred embodiment, D1 is greater than or equal to about 20 percent of D. In another preferred embodiment of the invention, W2 is greater than about 2 mm. Another preferred embodiment of the invention is constructed with W2 being about 3 times W1. In still another preferred embodiment of the invention, G1 and G2 are about equal to one another. In still another embodiment of the invention, W1 is less than about 0.8 mm. Other preferred embodiments of the invention are constructed such that G1 is greater than 2 mm and/or G2 is greater than about 2 mm. These values represent preferred embodiments of the invention only; other values and combinations thereof may be applied. These dimensions may also be used with voids having different overall shapes than those shown in the figures. Undulations may also be added to grooves of the present invention as well.

Simulations were prepared to investigate the rigidity of various embodiments of the invention relative to the volume of the voids for such embodiments. FIG. 6 represents a plot showing the results of such simulations in which the rigidity in the rolling direction is plotted as a function of the void volume. The dashed line at the top, left end represents the value of a straight groove with no voids while at the bottom end represents a groove having a void that extends the entire length of the groove. As shown, the rigidity of the sculpture decreases substantially as the overall volume of the void in the bottom of the groove increases.

Data point 102 represents tread feature 102 having groove 104 as shown in FIGS. 2A and 2B. Data point 202 represents tread feature 202 having a groove 204 as shown in FIG. 3. Data point 402 represents a tread feature 402 having a groove 404 as shown in FIG. 4. As indicated by the plot, each of these exemplary embodiments improved the rigidity of the structure at a given void volume as compared to the structures represented by the dashed line.

For a tire having a groove such as that shown in FIGS. 5A-5C, FIG. 7 provides a plot of a simulated rigidity along the rolling direction as a function of G1. As shown, the optimal range of values for G1 is between 2 and 4 mm with an optimum value at 3 mm.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire having an axis of rotation and defining lateral and circumferential directions, the tire comprising:
   a tread portion extending circumferentially around the tire, said tread portion having at least one tread feature comprising:
      a pair of sides that are opposed along the lateral direction;
      a groove extending between the pair of sides, the groove comprising a radially-outer portion fluidly connected with a radially-inner portion,
         the radially-outer portion of the groove defined by a pair of planar walls extending substantially parallel to each other, and
         the radially-inner portion of the groove comprising a plurality of voids that are spaced apart along a length of the groove, each void defined by i) a pair of planar diverging side walls that diverge along the radial direction moving toward the axis of rotation of the tire, ii) a planar base wall connected between the pair of diverging side walls, wherein the diverging sidewalls are planar and wherein the base wall is planar, and iii) one or more planar span walls connected between the pair of diverging side walls and the base wall such that the voids of the radially-inner portion are fluidly connected along the lateral direction only by the radially-outer portion of the groove;

wherein each void further comprises a pair of parallel walls that extend along the radial direction and connect to the diverging sides walls, the bottom wall, and the one or more span walls.

2. A tire as in claim 1, wherein at least one of the plurality of voids is adjacent to, and open along, one of the sides of the at least one tread feature.

3. A tire as in claim 1, the radially inner portion further comprising a plurality of partial voids that are spaced apart along the length of the groove, each partial void defined by i) a partial void diverging side wall that diverges from the radial direction moving towards the axis of rotation of the tire and ii) a side wall that is substantially parallel to the radial direction.

4. A tire as in claim 3, wherein the voids and partial voids of the radially-inner portion are arranged in an alternating manner along the length of the groove.

5. A tire as in claim 1, the groove having a depth along a radial direction of D and the radially-outer portion of the groove having a depth along the radial direction of D1, and wherein D1 is greater than or equal to 0.20 of D.

6. A tire as in claim 1, the radially-outer portion of the groove having a width of W1 and the radially inner portion of the groove having a width of W2, wherein W2 is greater than or equal to 3 times W1.

7. A tire as in claim 1, wherein the radially-outer portion of the groove has a width of W1 and the radially inner portion of the groove has a width of W2, wherein W2 is greater than or equal to 2 mm.

8. A tire as in claim 1, wherein each void of the plurality of voids of the radially-inner portion of said groove has a width G2 along the lateral direction that is equal to a width G1 along the lateral direction by which each of the voids are separated from each other.

9. A tire as in claim 8, wherein for each side of the tread feature, one of the voids of the plurality of voids is positioned along a side of the tread feature.

10. A tire as in claim 1, wherein said tread feature comprises a rib extending around a circumference of the tire, said rib comprising a plurality of the grooves that are equally spaced about the circumferential direction of the tire.

11. A tire as in claim 1, wherein said tread feature comprises a tread block.

12. A tire as in claim 1, wherein said tread feature comprises a tread block, said tread block comprising a plurality of the grooves.

13. A tire as in claim 1, wherein the groove is at a non-zero angle from the lateral direction.

14. A tire having an axis of rotation and defining lateral, radial, and circumferential directions, the tire comprising:

a tread portion extending circumferentially around the tire, said tread portion having at least one tread feature comprising:
    a pair of sides that are opposed along the lateral direction;
    a groove extending between the pair of sides, the groove comprising a radially-outer portion fluidly connected with a radially-inner portion,
        the radially-outer portion of the groove defined by a pair of planar walls extending substantially parallel to each other, and
        the radially-inner portion of the groove comprising a plurality of voids that are spaced apart along a length of the groove, each void defined by
            i) a pair of planar diverging side walls that diverge along the radial direction moving toward the axis of rotation of the tire, ii) a pair of parallel walls that extend along the radial direction and connect to the diverging side walls, iii) a planar base wall connected to the parallel sidewalls and spanning between the parallel side walls, and iv) one or more planar span walls connected between the pair of diverging side walls, the pair of parallel walls, and the base wall such that voids of the radially inner portion of the groove are fluidly connected only by the radially-outer portion of the groove; and wherein each void further comprises a pair of parallel walls that extend along the radial direction and connect to the diverging sides walls, the bottom wall, and the one or more span walls.

* * * * *